(12) United States Patent
Fukumura

(10) Patent No.: US 9,945,431 B2
(45) Date of Patent: Apr. 17, 2018

(54) ELECTROMAGNETIC CLUTCH

(71) Applicant: DENSO CORPORATION, Kariya, Aichi-pref. (JP)

(72) Inventor: Yoshinori Fukumura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/518,810

(22) PCT Filed: Dec. 8, 2015

(86) PCT No.: PCT/JP2015/006086
§ 371 (c)(1),
(2) Date: Apr. 13, 2017

(87) PCT Pub. No.: WO2016/103600
PCT Pub. Date: Jun. 30, 2016

(65) Prior Publication Data
US 2017/0241489 A1   Aug. 24, 2017

(30) Foreign Application Priority Data

Dec. 25, 2014   (JP) ................. 2014-262225

(51) Int. Cl.
*F16D 27/14*   (2006.01)
*F16D 27/112*   (2006.01)
(Continued)

(52) U.S. Cl.
CPC ............. *F16D 27/14* (2013.01); *F16D 27/02* (2013.01); *F16D 27/04* (2013.01); *F16D 27/08* (2013.01); *F16D 27/112* (2013.01); *F16D 28/00* (2013.01)

(58) Field of Classification Search
None
See application file for complete search history.

(56) References Cited

U.S. PATENT DOCUMENTS 2,857,998 A   10/1958   Harter
3,007,561 A *   11/1961   Harting ................. F16D 27/112
                                                        188/161
(Continued)

FOREIGN PATENT DOCUMENTS

FR   1130997 A   2/1957
JP   S47-36203 Y1   11/1972
(Continued)

*Primary Examiner* — Colby M Hansen
(74) *Attorney, Agent, or Firm* — Posz Law Group, PLC

(57) ABSTRACT

An inner peripheral surface of an outer cylindrical tubular portion and an outer peripheral surface of an inner cylindrical tubular portion of a rotor are respectively shaped into a stepped form. A radial distance between the outer cylindrical tubular portion and the inner cylindrical tubular portion at a counter-armature side location is larger than that of an armature side location in the rotor. An outer peripheral surface of an outer cylindrical tubular portion and an inner peripheral surface of an inner cylindrical tubular portion of a stator are respectively shaped into a stepped form. A radial distance between the outer peripheral surface of the outer cylindrical tubular portion and the inner peripheral surface of the inner cylindrical tubular portion at the counter-armature side location is larger than that of the armature side location in the stator.

4 Claims, 7 Drawing Sheets

(51) Int. Cl.
    *F16D 27/08* (2006.01)
    *F16D 28/00* (2006.01)
    *F16D 27/02* (2006.01)
    *F16D 27/04* (2006.01)

(56) References Cited

U.S. PATENT DOCUMENTS

| | | | | |
|---|---|---|---|---|
| 3,425,529 | A | | 2/1969 | Hayashi |
| 4,235,311 | A | * | 11/1980 | Brinkmann ............. F16D 55/00 188/161 |
| 5,791,039 | A | * | 8/1998 | Tabuchi ................ F16D 27/112 192/84.31 |
| 5,984,069 | A | * | 11/1999 | Takahashi ............. F16D 27/112 192/84.1 |
| 6,095,305 | A | * | 8/2000 | Yoshihara ............. F16D 27/112 192/84.941 |
| 6,209,699 | B1 | * | 4/2001 | Hayashi ................ F16D 27/112 192/200 |
| 6,364,084 | B1 | * | 4/2002 | Boyer ................... F16D 27/112 192/107 R |
| 2012/0111690 | A1 | | 5/2012 | Kurosu et al. |

FOREIGN PATENT DOCUMENTS

| | | |
|---|---|---|
| JP | 2011-158003 A | 8/2011 |
| KR | 1020040042349 A | 5/2004 |

* cited by examiner

ELECTROMAGNETIC CLUTCH

CROSS REFERENCE TO RELATED APPLICATIONS

This application is the U.S. national phase of International Application No. PCT/JP2015/006086 filed on Dec. 8, 2015 and is based on Japanese Patent Application No. 2014-262225 filed on Dec. 25, 2014, the disclosures of which are incorporated herein by reference.

TECHNICAL FIELD

The present disclosure relates to an electromagnetic clutch.

BACKGROUND

A previously proposed electromagnetic clutch includes a rotor, a stator and an electromagnetic coil. The electromagnetic coil is received in an inside space of the stator. The stator is placed in an inside space of the rotor while the electromagnetic coil is received in the stator.

More specifically, the rotor has a double cylindrical tubular structure that includes an outer cylindrical tubular portion and an inner cylindrical tubular portion. A space, which is formed between an inner peripheral surface of the outer cylindrical tubular portion and an outer peripheral surface of the inner cylindrical tubular portion, is the inside space of the rotor. Since the rotor is rotated about the stator, the inner peripheral surface of the outer cylindrical tubular portion and the outer peripheral surface of the inner cylindrical tubular portion of the rotor are both in parallel with an axial direction. Therefore, a distance between the outer cylindrical tubular portion and the inner cylindrical tubular portion of the rotor is constant.

Also, the stator has a double cylindrical tubular structure that includes an outer cylindrical tubular portion and an inner cylindrical tubular portion. A space, which is formed between an inner peripheral surface of the outer cylindrical tubular portion and an outer peripheral surface of the inner cylindrical tubular portion of the stator is the inside space of the stator. The outer peripheral surface of the outer cylindrical tubular portion of the stator is opposed to the inner peripheral surface of the outer cylindrical tubular portion of the rotor, and the inner peripheral surface of the inner cylindrical tubular portion of the stator is opposed to the outer peripheral surface of the inner cylindrical tubular portion of the rotor. Therefore, similar to the inner peripheral surface of the outer cylindrical tubular portion and the outer peripheral surface of the inner cylindrical tubular portion of the rotor, the outer peripheral surface of the outer cylindrical tubular portion and the inner peripheral surface of the inner cylindrical tubular portion of the stator are both in parallel with the axial direction, and thereby a distance between the outer peripheral surface of the outer cylindrical tubular portion and the inner peripheral surface of the inner cylindrical tubular portion of the stator measured in the radial direction of the stator is constant (see, for example, the patent literature 1).

With respect to the electromagnetic clutch, there are customer demands for reducing the size and the weight of the entire electromagnetic clutch, improving the transmission torque and reducing the electric power consumption. In order to meet these customer demands, it is necessary to increase a coil space without deteriorating the magnetic performance for the previously proposed electromagnetic clutch. Here, the coil space refers to an installation space for installing the coil.

For example, when the coil space is increased in comparison to the previously proposed electromagnetic clutch while maintaining the size of the rotor, the transmission torque can be improved. Furthermore, when the size of the rotor is reduced in comparison to the previously proposed electromagnetic clutch while maintaining the size of the coil space, the size and the weight of the entire electromagnetic clutch can be reduced.

PATENT LITERATURE

PATENT LITERATURE 1: JP2012-97875A (corresponding to US2012/0111690A1)

SUMMARY

The present disclosure is made in view of the above point, and it is an objective of the present disclosure to provide an electromagnetic clutch that can increase the coil space while limiting deterioration of the magnetic performance.

In order to achieve the above objective, there is provided an electromagnetic clutch that includes: an electromagnetic coil that generates an electromagnetic attractive force at a time of energizing the electromagnetic coil; a rotor that is rotated about a rotational central axis when the rotor receives a rotational drive force from a drive source; an armature that is coupled to the rotor by the electromagnetic attractive force at the time of energizing the electromagnetic coil and is decoupled from the rotor at a time of deenergizing the electromagnetic coil; and a stator that is placed in an inside of the rotor and receives the electromagnetic coil in an inside of the stator. The rotor includes: an outer cylindrical tubular portion that is centered at the rotational central axis; an inner cylindrical tubular portion that is placed in an inside of the outer cylindrical tubular portion and is centered at the rotational central axis; and a wall portion that connects between an end part of the outer cylindrical tubular portion and an end part of the inner cylindrical tubular portion, which are located on an armature side where the armature is placed. The stator includes: an outer cylindrical tubular portion that is centered at the rotational central axis; an inner cylindrical tubular portion that is placed in an inside of the outer cylindrical tubular portion of the stator and is centered at the rotational central axis; and a wall portion that connects between an end part of the outer cylindrical tubular portion of the stator and an end part of the inner cylindrical tubular portion of the stator, which are located on a counter-armature side that is apart from the armature. The outer cylindrical tubular portion and the inner cylindrical tubular portion of the stator are placed in an inside space, which is surrounded by the outer cylindrical tubular portion, the inner cylindrical tubular portion and the wall portion of the rotor; and an outer peripheral surface of the outer cylindrical tubular portion of the stator is opposed to an inner peripheral surface of the outer cylindrical tubular portion of the rotor such that a gap is formed between the outer peripheral surface of the outer cylindrical tubular portion of the stator and the inner peripheral surface of the outer cylindrical tubular portion of the rotor; and an inner peripheral surface of the inner cylindrical tubular portion of the stator is opposed to an outer peripheral surface of the inner cylindrical tubular portion of the rotor such that a gap is formed between the inner peripheral surface of the inner cylindrical tubular portion of the stator and the outer peripheral surface of the inner cylindrical tubular portion of the rotor. The electromagnetic coil is placed in an inside space that is surrounded by the outer cylindrical tubular portion, the inner cylindrical tubular portion and the wall portion of the stator. With respect to a distance between the outer cylindrical tubular portion and the inner cylindrical tubular portion of the rotor measured in a radial direction of the rotor, the outer cylindrical tubular portion and the inner cylindrical tubular portion of the rotor satisfy a relationship of that a second distance between the outer cylindrical tubular portion and the inner cylindrical tubular portion measured in the radial direction of the rotor at a location on the counter-armature side of a center location centered in an axial direction of the rotational central axis is larger than a first distance between the outer cylindrical tubular portion and the inner cylindrical tubular portion measured in the radial direction of the rotor at a location on the armature side of the center location centered in the axial direction of the rotational central axis. with respect to a distance between an outer peripheral surface of the outer cylindrical tubular portion of the stator and an inner peripheral surface of the inner cylindrical tubular portion of the stator measured in a radial direction of the stator, the outer cylindrical tubular portion and the inner cylindrical tubular portion of the stator satisfy a relationship of that a second distance between the outer peripheral surface of the outer cylindrical tubular portion of the stator and the inner peripheral surface of the inner cylindrical tubular portion of the stator measured in the radial direction of the stator at the location on the counter-armature side of the center location centered in the axial direction of the rotational central axis is larger than a first distance between the outer peripheral surface of the outer cylindrical tubular portion of the stator and the inner peripheral surface of the inner cylindrical tubular portion of the stator measured in the radial direction of the stator at the location on the armature side of the center location centered in the axial direction of the rotational central axis. With respect to a thickness of the outer cylindrical tubular portion of the stator measured in the radial direction of the stator and a thickness of the inner cylindrical tubular portion of the stator measured in the radial direction of the stator, at least one of the outer cylindrical tubular portion and the inner cylindrical tubular portion of the stator satisfies a relationship of that a second thickness of the at least one of the outer cylindrical tubular portion and the inner cylindrical tubular portion of the stator measured in the radial direction of the stator at the location on the counter-armature side of the center location centered in the axial direction of the rotational central axis is larger than a first thickness of the at least one of the outer cylindrical tubular portion and the inner cylindrical tubular portion of the stator measured in the radial direction of the stator at the location on the armature side of the center location centered in the axial direction of the rotational central axis.

In the previously proposed technique, the distance between the outer cylindrical tubular portion and the inner cylindrical tubular portion of the rotor is constant in the axial direction, so that a radial distance between the outer peripheral surface of the outer cylindrical tubular portion of the stator and the inner peripheral surface of the inner cylindrical tubular portion of the stator is also constant in the axial direction. Therefore, in a case where in order to limit the deterioration in the magnetic performance, a thickness of at least one of the outer cylindrical tubular portion and the inner cylindrical tubular portion of the stator is set such that a second thickness, which is measured at the location on the counter-armature side, is larger than a first thickness, which is measured at the location on the armature side, the radial distance between the outer cylindrical tubular portion and the inner cylindrical tubular portion of the stator is disadvantageously set such that the radial distance, which is measured at the counter-armature side, is smaller than the radial distance, which is measured at the armature side.

In contrast, according to the present disclosure, with respect to the distance between the outer cylindrical tubular portion and the inner cylindrical tubular portion of the rotor, the second distance, which is measured at the location on the counter-armature side, is larger than the first distance, which is measured at the location on the armature side. Also, with respect to the radial distance between the outer peripheral surface of the outer cylindrical tubular portion of the stator and the inner peripheral surface of the inner cylindrical tubular portion of the stator, the second distance, which is measured at the location on the counter-armature side, is larger than the first distance, which is measured at the location on the armature side. Therefore, in the case where the thickness of at least one of the outer cylindrical tubular portion and the inner cylindrical tubular portion of the stator is set such that the second thickness, which is measured at the location on the counter-armature side, is larger than the first thickness, which is measured at the location on the armature side, the radial distance between the outer cylindrical tubular portion and the inner cylindrical tubular portion of the stator can be set such that the radial distance, which is measured at the counter-armature side, is closer to the radial distance, which is measured at the armature side.

Therefore, with respect to the radial distance between the outer cylindrical tubular portion and the inner cylindrical tubular portion of the stator, the radial distance, which is measured at the counter-armature side, is increased in the present disclosure in comparison to the previously proposed technique.

Furthermore, according to the present disclosure, in order to limit the deterioration in the magnetic performance, at least one of the outer cylindrical tubular portion and the inner cylindrical tubular portion satisfies the relationship of that the second thickness, which is measured at the location on the counter-armature side, is larger than the first thickness, which is measured at the location on the armature side.

Furthermore, as in the case of the present disclosure, with respect to the distance between the outer cylindrical tubular portion and the inner cylindrical tubular portion of the rotor, even when the second distance, which is measured at the location on the counter-armature side, is increased in comparison to the first distance, which is measured at the location on the armature side, it is possible to limit the deterioration in the magnetic performance by designing the thicknesses of the outer cylindrical tubular portion and the inner cylindrical tubular portion of the rotor in a manner that avoids an excess increase in the magnetic flux density.

Therefore, according to the present disclosure, while the deterioration in the magnetic performance is limited, the radial dimension of the coil space can be increased, and thereby the coil space can be increased.

Furthermore, according to the present disclosure, the distance between the outer cylindrical tubular portion and the inner cylindrical tubular portion of the rotor is set such that the distance, which is measured at the location on the counter-armature side, is increased in comparison to the distance, which is measured at the location on the armature side. Thereby, even when the thicknesses of the outer cylindrical tubular portion and the inner cylindrical tubular portion of the rotor at the counter-armature side are reduced in comparison to the thicknesses of the outer cylindrical tubular portion and the inner cylindrical tubular portion of the rotor at the armature side, the influence on the magnetic performance is small due to the fact of that the portion, which is located at the counter-armature side, has the low magnetic flux density, so that even in the case where the thickness of the portion, which has the low magnetic flux density, is reduced, the influence on the magnetic performance is small. Therefore, in view of the above point, it is understood that the reduction in the magnetic performance can be limited according to the present disclosure.

DETAILED DESCRIPTION

Hereinafter, embodiments of the present disclosure will be described with reference to the accompanying drawings. In each of the following embodiments, the same or similar portions are indicated by the same reference signs.

First Embodiment

Figure 1:
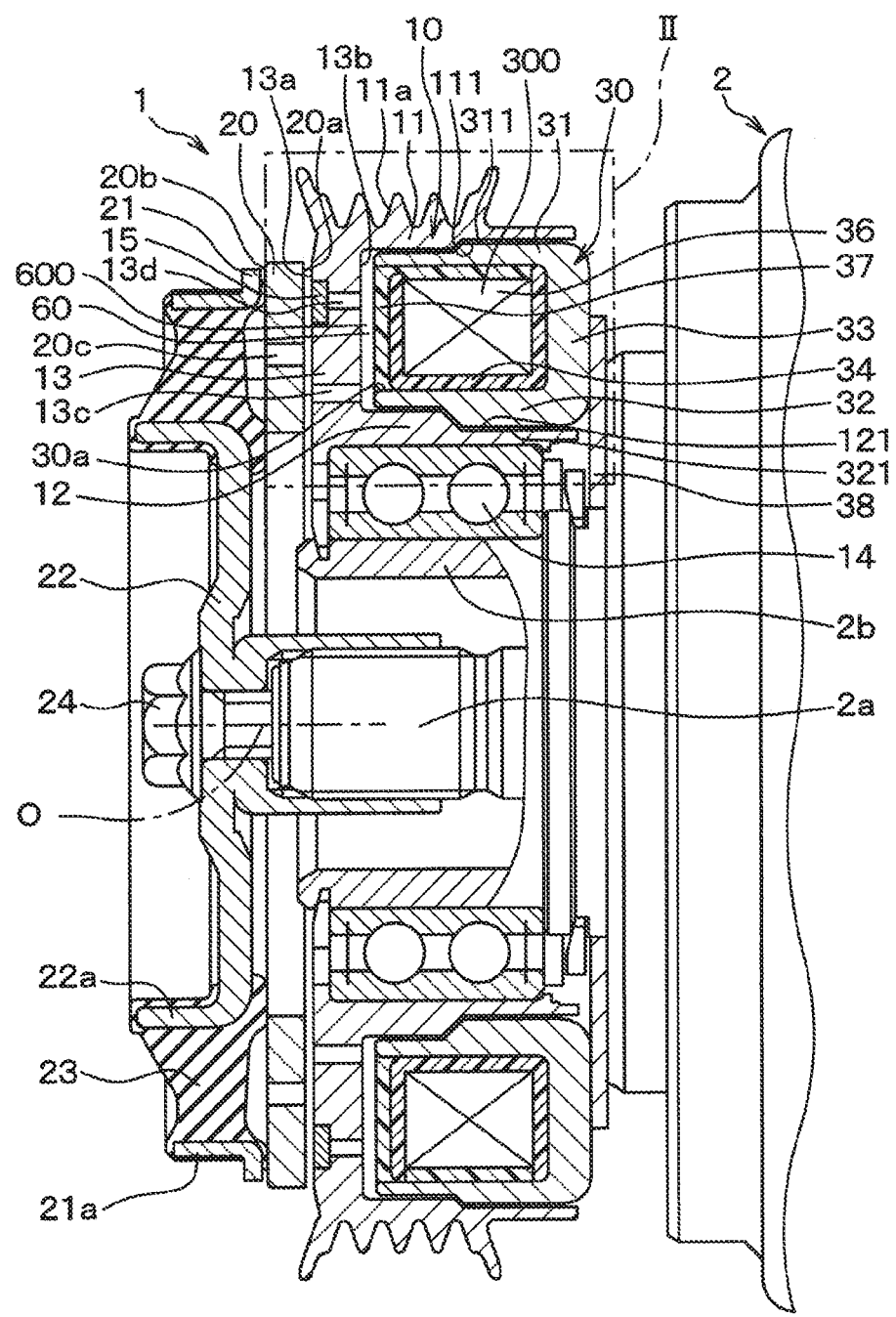
FIG. 1 is a cross-sectional view showing a structure of an electromagnetic clutch according to a first embodiment of the present disclosure.

An electromagnetic clutch 1 of a first embodiment shown in FIG. 1 is implemented by applying a principle of the present disclosure to a clutch mechanism of a compressor 2 that rotates a compression mechanism upon receiving a rotational drive force from an engine, which serves as a drive source that outputs a vehicle drive force. Therefore, in the present embodiment, the engine serves as the drive source, and the compressor 2 serves as a driven-side device.

The compressor 2 suctions and compresses refrigerant. The compressor 2 cooperates with a radiator, an expansion valve, and an evaporator to form a refrigeration cycle system of a vehicle air conditioning system. The radiator radiates heat from the refrigerant, which is discharged from the compressor 2. The expansion valve depressurizes and expands the refrigerant, which is outputted from the radiator. The evaporator evaporates the refrigerant, which is depressurized by the expansion valve, to implement heat absorption.

Figure 2:
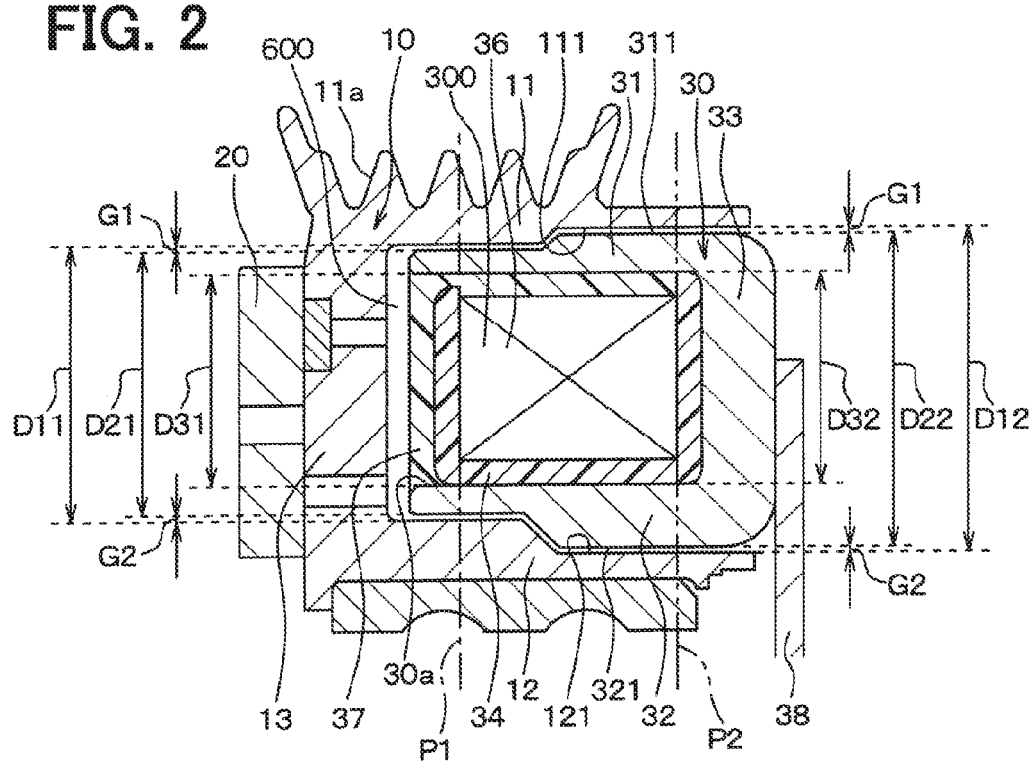
FIG. 2 is an enlarged view of an area II in FIG. 1.

The electromagnetic clutch 1 includes a rotor 10 and an armature 20. The rotor 10 forms a driving-side rotatable body, which is rotated about a rotational central axis O thereof when the rotor 10 receives the rotational drive force from the engine. The armature 20 forms a driven-side rotatable body, which is connected to a rotatable shaft 2a of the compressor 2. When the rotor 10 and the armature 20 are coupled with each other, conduction of the rotational drive force from the engine to the compressor 2 is enabled. In contrast, when the rotor 10 and the armature 20 are decoupled from each other, the conduction of the rotational drive force from the engine to the compressor 2 is disabled. FIG. 1 shows a state where the rotor 10 and the armature 20 are decoupled from each other. FIG. 2 shows a state where the rotor 10 and the armature 20 are coupled with each other.

That is, when the electromagnetic clutch 1 couples between the rotor 10 and the armature 20, the rotational drive force of the engine is conducted to the compressor 2 to drive the refrigeration cycle system. In contrast, when the electromagnetic clutch 1 decouples between the rotor 10 and the armature 20, the rotational drive force of the engine is not conducted to the compressor 2. Thereby, the refrigeration cycle system is not driven. The operation of the electromagnetic clutch 1 is controlled by a control signal, which is outputted from an air conditioning control device that controls the operation of each corresponding one of the constituent devices of the refrigeration cycle system.

Now, a specific structure of the electromagnetic clutch 1 will be described. As shown in FIG. 1, the electromagnetic clutch 1 includes the rotor 10, the armature 20 and a stator 30. In the following description, one side (the left side in FIG. 1) of the rotor 10 and the stator 30, at which the armature 20 is placed, is defined as an armature side, and an opposite side (the right side in FIG. 1) of the rotor 10 and the stator 30, which is opposite from the armature 20, is defined as a counter-armature side.

The rotor 10 is a double cylindrical tubular structure, which has an opening on the counter-armature side (the right side in FIG. 1) that is spaced away from the armature 20, and a cross section of the double cylindrical tubular structure is configured to have a U-shape. Specifically, the rotor 10 includes an outer cylindrical tubular portion 11, an inner cylindrical tubular portion 12 and a wall portion 13. The outer cylindrical tubular portion 11 is centered at the rotational central axis O. The inner cylindrical tubular portion 12 is placed on a radially inner side of the outer cylindrical tubular portion 11 and is centered at the rotational central axis O. The wall portion 13 extends in a direction that is perpendicular to the rotational central axis O in such a manner that the wall portion 13 connects between an end part of the outer cylindrical tubular portion 11 and an end part of the inner cylindrical tubular portion 12, which are located on the armature 20 side. The outer cylindrical tubular portion 11 and the inner cylindrical tubular portion 12 are portions of the rotor 10, which are located on the counter-armature side (the right side in FIG. 1) of the wall portion 13. The outer cylindrical tubular portion 11, the inner cylindrical tubular portion 12, and the wall portion 13 are made of a magnetic material (e.g., an iron material).

The outer cylindrical tubular portion 11 and the inner cylindrical tubular portion 12 are arranged coaxially with the rotatable shaft 2a of the compressor 2. Specifically, the rotational central axis O of FIG. 1 serves as a rotational central axis of the outer cylindrical tubular portion 11 and of the inner cylindrical tubular portion 12 and also a rotational central axis of the rotatable shaft 2a. A V-groove 11a, around which a V-belt is wound, is formed in an outer peripheral part of the outer cylindrical tubular portion 11. An outer race of a ball bearing 14 is fixed to an inner peripheral part of the inner cylindrical tubular portion 12.

The ball bearing 14 rotatably supports the rotor 10 relative to a housing that forms an outer shell of the compressor 2. Therefore, an inner race of the ball bearing 14 is fixed to a housing boss 2b, which is formed in the housing of the compressor 2.

The wall portion 13 includes one end surface 13a and the other end surface 13b, which are located on one side and the other side, respectively, in an axial direction of the rotational central axis O, and these end surfaces 13a, 13b are spaced from each other in the axial direction and extend in the direction that is perpendicular to the axial direction. In the wall portion 13, magnetic shield slits 13c, 13d, which are respectively configured into an arcuate form and are arranged in two rows in a view taken in the axial direction, are formed. The magnetic shield slits 13c, 13d extend through the wall portion 13 in the axial direction. The one end surface 13a of the wall portion 13 is opposed to the armature 20 and is formed as a friction surface of the rotor 10, which contacts the armature 20 when the rotor 10 and the armature 20 are coupled with each other. Thereby, the one end surface 13a of the wall portion 13 will be also referred to as a friction surface 13a.

In the present embodiment, a friction member 15, which increases a friction coefficient of the wall portion 13, is placed in a part of the friction surface 13a of the wall portion 13. The friction member 15 is made of a non-magnetic material. Specifically, this non-magnetic material may be a material formed by mixing alumina into resin and solidifying the same. Alternatively, the non-magnetic material may be a sintered material of metal powder (e.g., aluminum powder).

The armature 20 is made of a magnetic material (e.g., iron material). The armature 20 is a circular disk member, which extends in the direction perpendicular to the rotational central axis O and has a through-hole that extends in the axial direction of the rotational central axis O through a center part of the circular disk member. The armature 20 includes one end surface 20a and the other end surface 20b, which are located on one side and the other side, respectively, in the axial direction of the rotational central axis O. A rotational center of the armature 20 is coaxial with the rotatable shaft 2a of the compressor 2. Specifically, the rotational central axis of the armature 20 coincides with the rotational central axis O.

Similar to the wall portion 13 of the rotor 10, the armature 20 has a plurality of magnetic shield slits 20c, each of which is configured into an arcuate form in the view taken in the axial direction. The magnetic shield slits 20c extend through the one end surface 20a and the other end surface 20b of the armature 20. The magnetic shield slits 20c are radially placed between the magnetic shield slits 13c, which are located on the radially inner side in the wall portion 13, and the magnetic shield slits 13d, which are located on the radially outer side in the wall portion 13.

The one end surface 20a of the armature 20 is opposed to the friction surface 13a of the rotor 10 and is formed as a friction surface, which contacts the rotor 10 when the rotor 10 and the armature 20 are coupled with each other. Thereby, hereinafter, the one end surface 20a of the armature 20 will be also referred to as a friction surface 20a of the armature 20. An outer hub 21, which is configured into a generally circular disk form, is fixed to the other end surface 20b of the armature 20.

The outer hub 21 and an inner hub 22 described later form a connecting member, which connects between the armature 20 and the rotatable shaft 2a of the compressor 2. Each of the outer hub 21 and the inner hub 22 includes a cylindrical tubular portion 21a, 22a, which extends in the axial direction of the rotational central axis O. A cylindrical tubular rubber 23, which is a resilient member made of a resilient material (elastomer), is vulcanized and is secured to an inner peripheral surface of the cylindrical tubular portion 21a of the outer hub 21 and an outer peripheral surface of the cylindrical tubular portion 22a of the inner hub 22.

Furthermore, the inner hub 22 is fixed to the rotatable shaft 2a of the compressor 2 when a bolt 24, which is threadably fitted into a threaded screw hole of the rotatable shaft 2a, is tightened. Specifically, the inner hub 22 is configured to be coupleable with the rotatable shaft 2a of the compressor 2.

In this way, the armature 20, the outer hub 21, the rubber 23, the inner hub 22 and the rotatable shaft 2a of the compressor 2 are joined one after another. When the rotor 10 and the armature 20 are coupled with each other, the armature 20, the outer hub 21, the rubber 23, the inner hub 22, and the rotatable shaft 2a of the compressor 2 are rotated together with the rotor 10.

Furthermore, the rubber 23 exerts a resilient force relative to the outer hub 21 in a direction away from the rotor 10. In the decoupled state where the rotor 10 and the armature 20 are decoupled from each other, this resilient force forms a gap of a predetermined distance between the friction surface 13a of the rotor 10 and the friction surface 20a of the armature 20 that is joined to the outer hub 21.

The stator 30 is a non-rotatable body that is fixed to the compressor 2 and does not rotate in the present embodiment. The stator 30 is placed in an inside space 600 of the rotor 10, which is surrounded by the outer cylindrical tubular portion 11, the inner cylindrical tubular portion 12 and the wall portion 13 of the rotor 10. Thereby, the stator 30 is opposed to the other end surface 13b of the wall portion 13 and forms a space 60 between the stator 30 and the other end surface 13b of the wall portion 13. The stator 30 is made of a magnetic material (e.g., an iron material) and receives an electromagnetic coil 36 in an inside of the stator 30.

The stator 30 is a double cylindrical tubular structure, which has an opening 30a on the armature side (the left side in FIG. 1), and a cross section of the double cylindrical tubular structure is configured to have a U-shape. Specifically, the stator 30 includes an outer cylindrical tubular portion 31, an inner cylindrical tubular portion 32 and a wall portion 33. The outer cylindrical tubular portion 31 is centered at the rotational central axis O. The inner cylindrical tubular portion 32 is placed on a radially inner side of the outer cylindrical tubular portion 31 and is centered at the rotational central axis O. The wall portion 33 extends in the direction that is perpendicular to the rotational central axis O in such a manner that the wall portion 33 connects between an end part of the outer cylindrical tubular portion 31 and an end part of the inner cylindrical tubular portion 32, which are located on the counter-armature side. The outer cylindrical tubular portion 31 and the inner cylindrical tubular portion 32 are portions of the stator 30, which are placed on the armature side (the left side in FIG. 1) of the wall portion 33.

As shown in FIG. 2, the outer cylindrical tubular portion 31 and the inner cylindrical tubular portion 32 of the stator 30 are placed in the inside space 600 of the rotor 10. An outer peripheral surface 311 of the outer cylindrical tubular portion 31 of the stator 30 is opposed to an inner peripheral surface 111 of the outer cylindrical tubular portion 11 of the rotor 10 while a gap G1 is interposed between the outer peripheral surface 311 and the inner peripheral surface 111. An inner peripheral surface 321 of the inner cylindrical tubular portion 32 of the stator 30 is opposed to an outer peripheral surface 121 of the inner cylindrical tubular portion 12 of the rotor 10 while a gap G2 is interposed between the inner peripheral surface 321 and the outer peripheral surface 121. The gaps G1, G2 are respectively set to be a minimum distance to minimize a magnetic resistance and are respectively set to be constant.

The electromagnetic coil 36 is placed in an inside space 300, which is surrounded by the outer cylindrical tubular portion 31, the inner cylindrical tubular portion 32 and the wall portion 33 of the stator 30. Specifically, a coil spool 34, which is shaped into an annular form, is received in the inside space 300 of the stator 30. The coil spool 34 is made of a resin material, such as polyamide resin. The electromagnetic coil 36 is wound around the coil spool 34. A cross section of the wounded electromagnetic coil 36 is in a generally rectangular form (a right angle quadrangle form).

Furthermore, a resin member 37, which seals the electromagnetic coil 36, is placed at the opening 30a side of the stator 30. In this way, the opening 30a of the stator 30 is closed by the resin member 37. The resin member 37 is made of, for example, polyamide resin.

Furthermore, as shown in FIG. 1, a stator plate 38 is fixed to the outer side (the right side in FIG. 1) of the wall portion 33 of the stator 30. The stator 30 is fixed to the housing of the compressor 2 through the stator plate 38.

Next, the operation of the electromagnetic clutch 1, which is constructed in the above-described manner, will be described. When the electromagnetic coil 36 is energized, the armature 20 is magnetically attracted to the friction surface 13a of the rotor 10 by the electromagnetic attractive force generated from the electromagnetic coil 36, so that the rotor 10 and the armature 20 are coupled with each other. Thereby, the rotational drive force is conducted from the engine to the compressor 2.

In contrast, when the supply of the electric power to the electromagnetic coil 36 is stopped, i.e., when the electromagnetic coil 36 is deenergized, the armature 20 is separated from the friction surface 13a of the rotor 10 by the resilient force of the rubber 23. Thereby, the rotational drive force is not conducted from the engine to the compressor 2.

Figure 3:
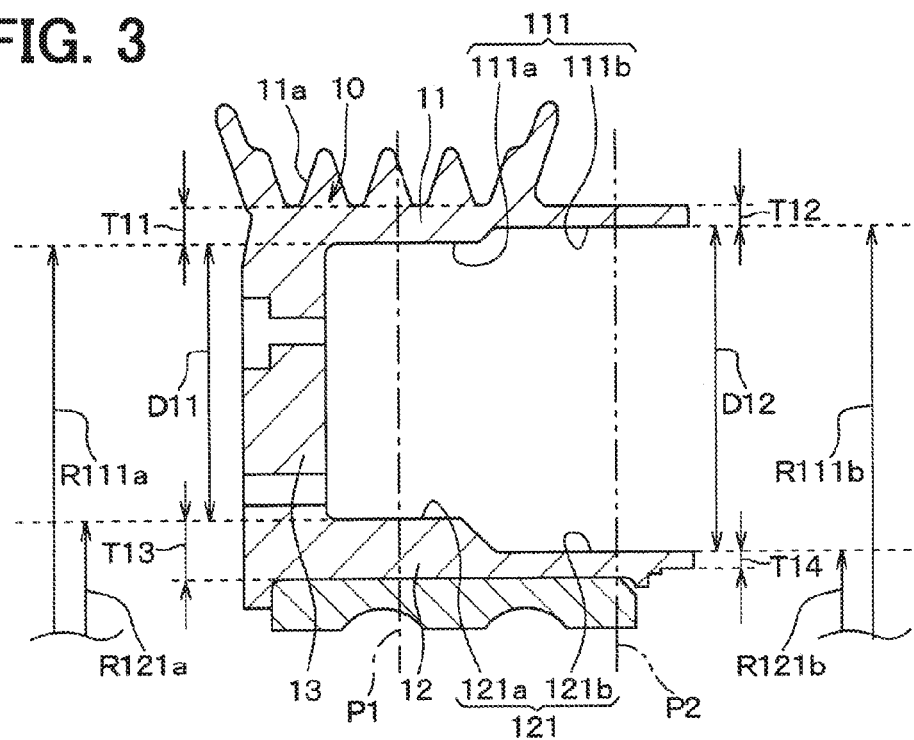
FIG. 3 is a cross-sectional view of a rotor shown in FIG. 2.
Figure 4:
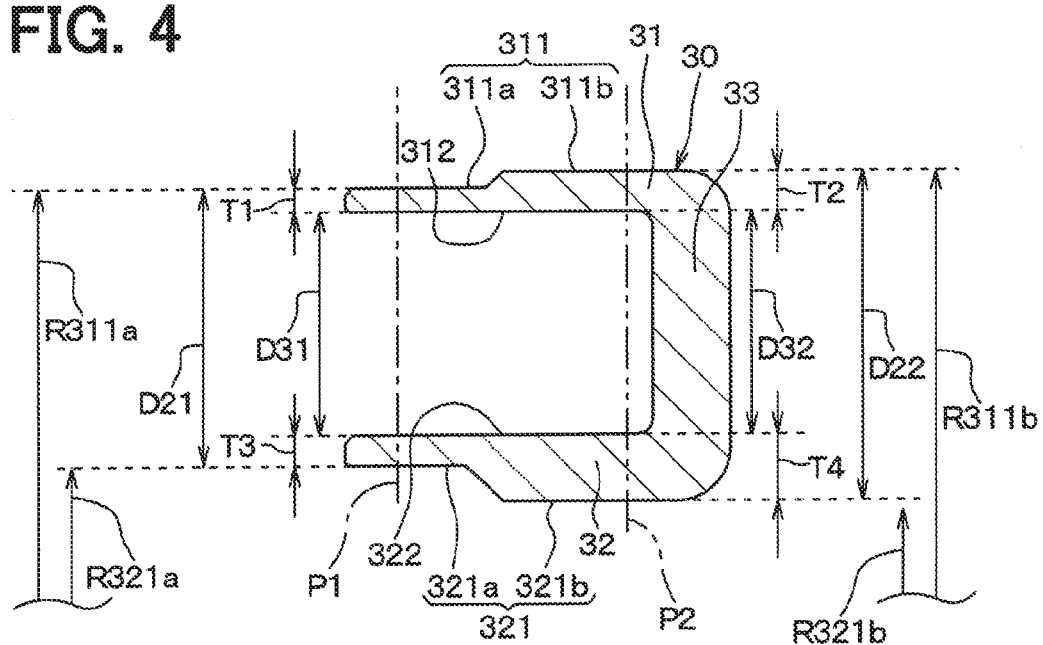
FIG. 4 is a cross-sectional view of a stator shown in FIG. 2.

Next, configurations of the rotor 10 and of the stator 30 will be described with reference to FIGS. 2 to 4.

First of all, configurations of the outer cylindrical tubular portion 11 and of the inner cylindrical tubular portion 12 of the rotor 10 will be described. As shown in FIGS. 2 and 3, the inner peripheral surface 111 of the outer cylindrical tubular portion 11 is shaped into a stepped form that includes a first inner peripheral surface 111a and a second inner peripheral surface 111b. The first inner peripheral surface 111a has a diameter R111a, which is constant. The second inner peripheral surface 111b is located on the counter-armature side of the first inner peripheral surface 111a, which is opposite from the armature 20, and the second inner peripheral surface 111b has a diameter R111b, which is constant and is larger than the diameter R111a of the first inner peripheral surface 111a.

Similarly, the outer peripheral surface 121 of the inner cylindrical tubular portion 12 is shaped into a stepped form that includes a first outer peripheral surface 121a and a second outer peripheral surface 121b. The first outer peripheral surface 121a has a diameter R121a, which is constant. The second outer peripheral surface 121b is located on the counter-armature side of the first outer peripheral surface 121a, which is opposite from the armature 20, and the second outer peripheral surface 121b has a diameter R121b, which is constant and is smaller than the diameter R121a of the first outer peripheral surface 121a.

Therefore, the outer cylindrical tubular portion 11 and the inner cylindrical tubular portion 12 satisfy the following relationship. Here, it is assumed that a distance, which is measured between the outer cylindrical tubular portion 11 and the inner cylindrical tubular portion 12 in a radial direction of the rotor 10 at an armature side location, is defined as a first distance D11, and a distance, which is measured between the outer cylindrical tubular portion 11 and the inner cylindrical tubular portion 12 in the radial direction of the rotor 10 at a counter-armature side location, is defined as a second distance D12. The second distance D12 is larger than the first distance D11 (i.e., D11<D12).

The armature side location refers to a location, which is on the armature side of an axial center in the axial direction of the rotational central axis O, and the counter-armature side location refers to a location, which is on the counter-armature side of the axial center in the axial direction of the rotational central axis O. More specifically, the armature side location is an armature side end location (a location P1 indicated by a dot-dash line in, for example, FIG. 2) of an overlapping range of the outer cylindrical tubular portion 31 and the inner cylindrical tubular portion 32 where the electromagnetic coil 36 overlaps with the outer cylindrical tubular portion 31 and the inner cylindrical tubular portion 32 when the electromagnetic coil 36, which is received in the inside of the stator 30, is projected relative to the outer cylindrical tubular portion 31 and the inner cylindrical tubular portion 32 in a direction that is perpendicular to the rotational central axis O. The counter-armature side location is a counter-armature side end location (a location P2 indicated by a dot-dot-dash line in, for example, FIG. 2) of this overlapping range. In other words, the armature side location is a location that is opposed to an armature side end of the electromagnetic coil 36 placed in the inside of the stator 30, and the counter-armature side location is a location that is opposed to a counter-armature side end of the electromagnetic coil 36 placed in the inside of the stator 30. The definitions of the armature side location and the counter-armature side location are also equally applicable for the other dimensional relationships described later.

The outer cylindrical tubular portion 11 of the rotor 10 satisfies the following relationship. With respect to a thickness of the outer cylindrical tubular portion 11 of the rotor 10, which is measured in the radial direction of the rotor 10, a second thickness T12 of the outer cylindrical tubular portion 11 measured at the counter-armature side location is smaller than a first thickness T11 of the outer cylindrical tubular portion 11 measured at the armature side location (i.e., T11>T12). The thickness of the outer cylindrical tubular portion 11 measured in a forming range of the V-groove 11a is a thickness that is measured at a position of a valley bottom of the V-groove 11a, which serves as a reference.

Similarly, the inner cylindrical tubular portion 12 of the rotor 10 satisfies the following relationship. With respect to a thickness of the inner cylindrical tubular portion 12 of the rotor 10, which is measured in the radial direction of the rotor 10, a second thickness T14 of the inner cylindrical tubular portion 12 measured at the counter-armature side location is smaller than a first thickness T13 of the inner cylindrical tubular portion 12 measured at the armature side location (i.e., T13>T14).

Next, configurations of the outer cylindrical tubular portion 31 and the inner cylindrical tubular portion 32 of the stator 30 will be described. As shown in FIGS. 2 and 4, the outer peripheral surface 311 of the outer cylindrical tubular portion 31 is shaped into a stepped form that includes a first outer peripheral surface 311a and a second outer peripheral surface 311b. The first outer peripheral surface 311a has a diameter R311a, which is constant. The second outer peripheral surface 311b is located on the counter-armature side of the first outer peripheral surface 311a, which is opposite from the armature 20, and the second outer peripheral surface 311b has a diameter R311b, which is constant and is larger than the diameter R311a of the first outer peripheral surface 311a.

An inner peripheral surface 312 of the outer cylindrical tubular portion 31 is shaped to have a diameter, which is constant, and the inner peripheral surface 312 extends in parallel in the axial direction of the rotational central axis O.

The inner peripheral surface 321 of the inner cylindrical tubular portion 32 is shaped into a stepped form that includes a first inner peripheral surface 321a and a second inner peripheral surface 321b. The first inner peripheral surface 321a has a diameter R321a, which is constant. The second inner peripheral surface 321b is located on the counter-armature side of the first inner peripheral surface 321a, which is opposite from the armature 20, and the second inner peripheral surface 321b has a diameter R321b, which is constant and is smaller than the diameter R321a of the first inner peripheral surface 321a.

An outer peripheral surface 322 of the inner cylindrical tubular portion 32 is shaped to have a diameter, which is constant, and the outer peripheral surface 322 extends in parallel with the axial direction of the rotational central axis O.

Therefore, the outer cylindrical tubular portion 31 and the inner cylindrical tubular portion 32 satisfy the following relationship. With respect to a distance, which is measured between the outer peripheral surface 311 of the outer cylindrical tubular portion 31 and the inner peripheral surface 321 of the inner cylindrical tubular portion 32 in the radial direction of the stator 30, a second distance D22, which is measured at the counter-armature side location, is larger than a first distance D21, which is measured at the armature side location (i.e., D21<D22).

The outer cylindrical tubular portion 31 and the inner cylindrical tubular portion 32 are arranged in such a manner that a distance between the outer cylindrical tubular portion 31 and the inner cylindrical tubular portion 32 is constant. Specifically, a first distance D31, which is measured at the armature side location, is the same as a second distance D32, which is measured at the counter-armature side location.

Furthermore, the outer cylindrical tubular portion 31 satisfies the following relationship. With respect to a thickness of the outer cylindrical tubular portion 31 measured in the radial direction of the stator 30, a second thickness T2, which is measured at the counter-armature side location, is larger than a first thickness T1, which is measured at the armature side location (i.e., T1<T2).

Similar to the outer cylindrical tubular portion 31, the inner cylindrical tubular portion 32 satisfies the following relationship. With respect to a thickness of the inner cylindrical tubular portion 32 measured in the radial direction of the stator 30, a second thickness T4, which is measured at the counter-armature side location, is larger than a first thickness T3, which is measured at the armature side location (i.e., T3<T4).

Figure 5:
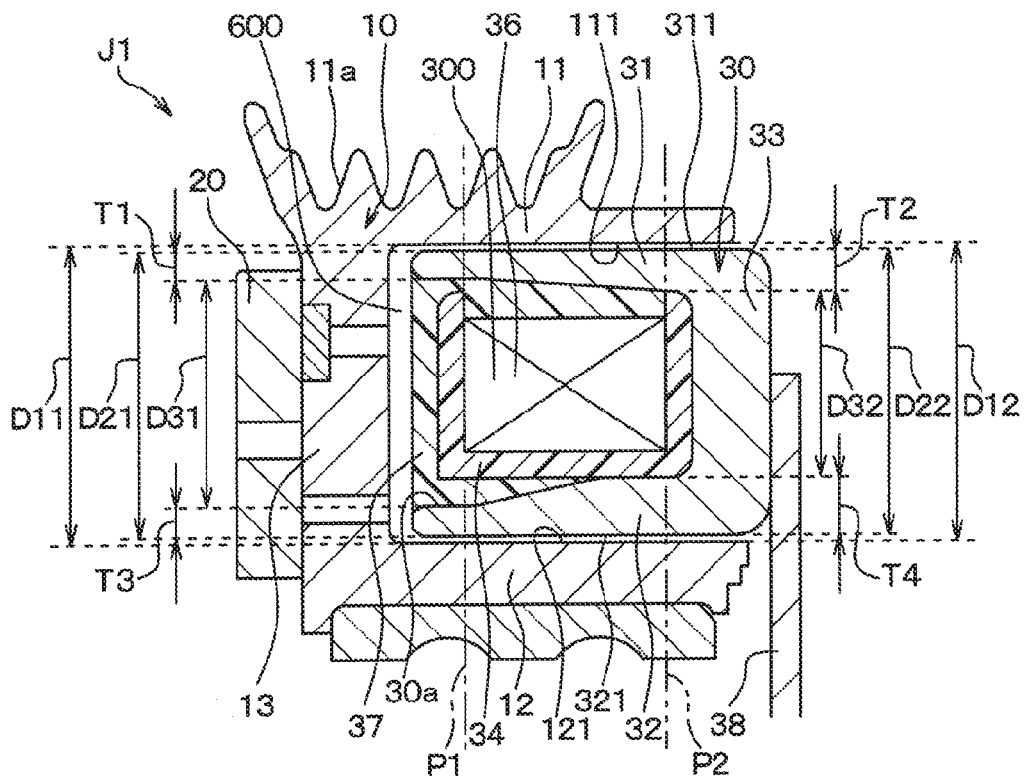
FIG. 5 is a cross-sectional view of a rotor and a stator of an electromagnetic clutch in a first comparative example.

Next, the electromagnetic clutch 1 of the present embodiment and an electromagnetic clutch J1 of a first comparative example shown in FIG. 5 will be compared with each other.

The first comparative example is similar to the present embodiment with respect to the following point. That is, with respect to the thickness of the outer cylindrical tubular portion 31 and the thickness of the inner cylindrical tubular portion 32 of the stator 30 measured in the radial direction of the stator 30 in the first comparative example, the second thickness T2, T4, which is measured at the counter-armature side location, is larger than the first thickness T1, T3, which is measured at the armature side location (i.e., T1<T2, T3<T4). However, the first comparative example differs from the present embodiment with respect to that the inner peripheral surface 111 of the outer cylindrical tubular portion 11 and the outer peripheral surface 121 of the inner cylindrical tubular portion 12 of the rotor 10, and the outer peripheral surface 311 of the outer cylindrical tubular portion 31 and the inner peripheral surface 321 of the inner cylindrical tubular portion 32 of the stator 30 are in parallel with the axial direction of the rotational central axis O. Therefore, in the first comparative example, the distance between the outer cylindrical tubular portion 11 and the inner cylindrical tubular portion 12 in the rotor 10 is constant (D11=D12), and the distance between the outer peripheral surface 311 of the outer cylindrical tubular portion 31 and the inner peripheral surface 321 of the inner cylindrical tubular portion 32 in the stator 30 is constant (D21=D22). The rest of the structure of the first comparative example is the same as that of the present embodiment.

Figure 6:
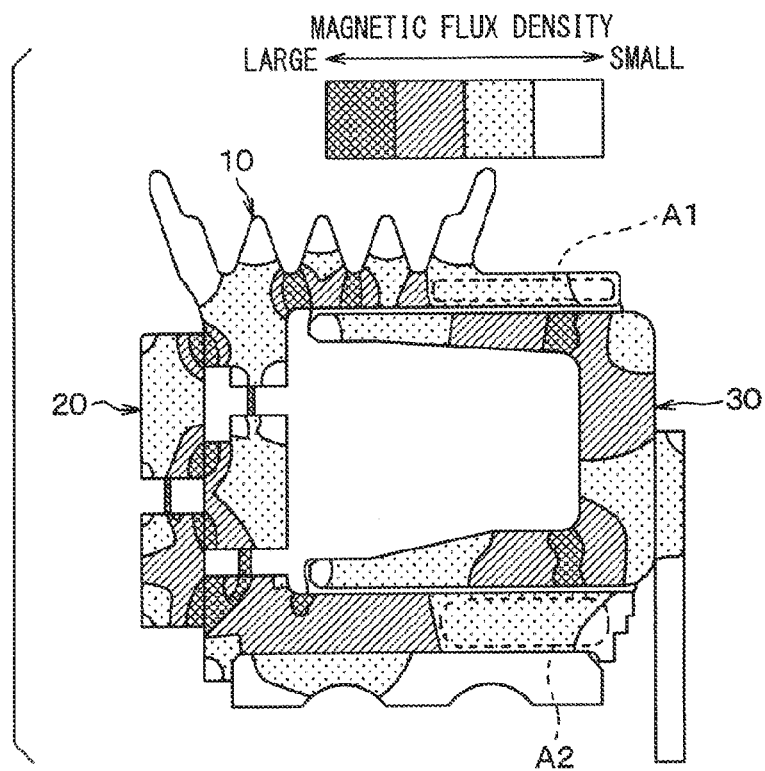
FIG. 6 is a diagram showing a result of magnetic field analysis of the rotor and the stator of the electromagnetic clutch of the first comparative example.

Here, FIG. 6 indicates a result of magnetic field analysis of the rotor 10 and the stator 30 of the electromagnetic clutch J1 of the first comparative example. FIG. 6 corresponds to the cross-sectional view of the rotor 10 and the stator 30 shown in FIG. 5.

At the time of energizing the electromagnetic coil 36, a magnetic flux flows through the outer cylindrical tubular portion 11, the wall portion 13 and the inner cylindrical tubular portion 12 of the rotor 10, and the inner cylindrical tubular portion 32, the wall portion 33 and the outer cylindrical tubular portion 31 of the stator 30, so that a magnetic circuit is formed. At this time, in a region where the rotor 10 and the stator 30 are opposed to each other, the magnetic flux moves from one of the rotor 10 and the stator 30 to the other one of the rotor 10 and the stator 30. Therefore, as shown in FIG. 6, a magnetic flux density becomes high at a base side part (an armature side part, i.e., a left part in FIG. 6) of each of the outer cylindrical tubular portion 11 and the inner cylindrical tubular portion 12 of the rotor 10 and also at a base side part (a counter-armature side part, i.e., a right part in FIG. 6) of each of the outer cylindrical tubular portion 31 and the inner cylindrical tubular portion 32 of the stator 30. When the magnetic flux density becomes excessively high at the base portions discussed above, the amount of the magnetic flux, which flows in the magnetic circuit, becomes small. Thereby, in the region where the rotor 10 and the stator 30 are opposed to each other, the magnetic attractive force is disadvantageously reduced. Therefore, it is required to set the thicknesses of the outer cylindrical tubular portion 11 and the inner cylindrical tubular portion 12 of the rotor 10 and the outer cylindrical tubular portion 31 and the inner cylindrical tubular portion 32 of the stator 30 in a manner that avoids the excessive increase of the magnetic flux density. When these thicknesses are increased, the weight of the electromagnetic clutch is increased. Therefore, it is desirable that these thicknesses are not excessively increased.

As a result, in view of limiting the reduction of the magnetic performance and reducing the weight of the electromagnetic clutch, it is desirable to satisfy the relationships of T1<T2, T3<T4 with respect to the thicknesses of the outer cylindrical tubular portion 31 and the inner cylindrical tubular portion 32 of the stator 30.

However, in the case of the first comparative example where the inner peripheral surface 111 of the outer cylindrical tubular portion 11 and the outer peripheral surface 121 of the inner cylindrical tubular portion 12 in the rotor 10 and the outer peripheral surface 311 of the outer cylindrical tubular portion 31 and the inner peripheral surface 321 of the inner cylindrical tubular portion 32 in the stator 30 are in parallel with the axial direction of the rotational central axis O, when the relationships of T1<T2, T3<T4 are applied to the thicknesses of the outer cylindrical tubular portion 31 and the inner cylindrical tubular portion 32 of the stator 30, the following disadvantage is encountered. That is, as shown in FIG. 5, with respect to the distance between the outer cylindrical tubular portion 31 and the inner cylindrical tubular portion 32 of the stator 30, the second distance D32, which is measured at the counter-armature side location, becomes smaller than the first distance D31, which is measured at the armature side location (i.e., D31<D32). Therefore, in the case where a coil space having a rectangular cross section is ensured, a maximum radial dimension of the coil space is the second distance D32.

In contrast, according to the present embodiment, the inner peripheral surface 111 of the outer cylindrical tubular portion 11 and the outer peripheral surface 121 of the inner cylindrical tubular portion 12 in the rotor 10 are respectively shaped into the corresponding stepped form, and in conformity with this configuration, the outer peripheral surface 311 of the outer cylindrical tubular portion 31 and the inner peripheral surface 321 of the inner cylindrical tubular portion 32 in the stator 30 are respectively shaped into the corresponding stepped form.

Thereby, as shown in FIG. 2, with respect to the distance between the outer cylindrical tubular portion 11 and the inner cylindrical tubular portion 12 in the rotor 10, the second distance D12, which is measured at the counter-armature side location, is set to be larger than the first distance D11, which is measured at the armature side location (i.e., D11<D12). Also, with respect to the radial distance between the outer peripheral surface 311 of the outer cylindrical tubular portion 31 and the inner peripheral surface 321 of the inner cylindrical tubular portion 32 in the stator 30, the second distance D22, which is measured at the counter-armature side location, is set to be larger than the first distance D21, which is measured at the armature side location (i.e., D21<D22).

Therefore, when the relationships of T1<T2, T3<T4 are applied to the thicknesses of the outer cylindrical tubular portion 31 and the inner cylindrical tubular portion 32 in the stator 30, the following advantage can be implemented. That is, with respect to the distance between the outer cylindrical tubular portion 31 and the inner cylindrical tubular portion 32 in the stator 30, the second distance D32, which is measured at the counter-armature side location, can be approximated to the first distance D31, which is measured at the armature side location. In other words, the shape of the inner peripheral surface 312 of the outer cylindrical tubular portion 31 and the shape of the outer peripheral surface 322 of the inner cylindrical tubular portion 32 in the stator 30 can be approximated to a shape that is in parallel with the axial direction of the rotational central axis O.

Thus, in the case where it is assumed that the first distance D31 of the stator 30 is the same in both of the first comparative example and the present embodiment, the maximum radial dimension of the coil space can be increased in the present embodiment in comparison to the first comparative example.

Figure 7:
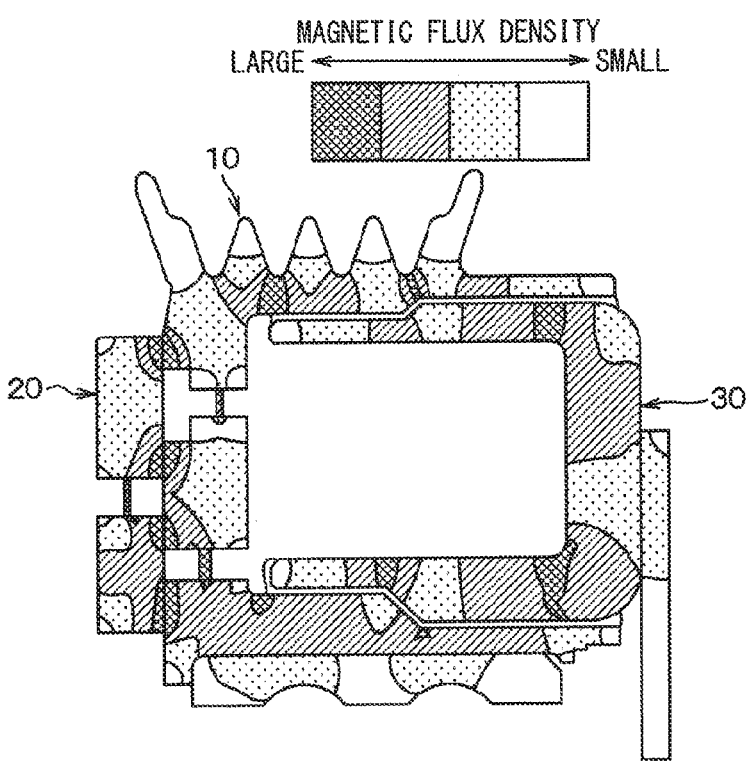
FIG. 7 is a diagram showing a result of magnetic field analysis of the rotor and the stator of the electromagnetic clutch of the first embodiment.

Furthermore, the rotor 10 of the present embodiment is shaped such that a thickness of a distal end side part A1 of the outer cylindrical tubular portion 11 and a thickness of a distal end side part A2 of the inner cylindrical tubular portion 12 are reduced in comparison to those of the rotor 10 of the first comparative example (see FIG. 6). As understood from FIG. 6, the magnetic flux density is low in the distal end side parts A1, A2. Therefore, even when the thicknesses of the distal end side parts A1, A2 are reduced, an influence on the magnetic performance is small. This is also confirmed by a result of the magnetic field analysis shown in FIG. 7. Specifically, as shown in FIG. 7, the magnetic flux density is not largely increased at the distal end side part of the outer cylindrical tubular portion 11 and the distal end side part of the inner cylindrical tubular portion 12. Therefore, the magnetic flux density distribution of the present embodiment is similar to the magnetic flux density distribution of the first comparative example. Thus, it is understood that in comparison to the first comparative example, the amount of magnetic flux, which flows through the entire magnetic circuit, is not reduced, and thereby the magnetic performance is not reduced in the present embodiment.

In other words, according to the present embodiment, in the rotor 10, the base side part of the outer cylindrical tubular portion 11 and the base side part of the inner cylindrical tubular portion 12, which have the relatively high magnetic flux density, have the increased thicknesses that are larger than the thickness of the distal end side part of the outer cylindrical tubular portion 11 and the thickness of the distal end side part of the inner cylindrical tubular portion 12, respectively. Thereby it is possible to limit the decrease in the magnetic performance.

Thereby, according to the present embodiment, in comparison to the first comparative example, the reduction in the magnetic performance is limited, and the radial dimension of the coil space can be increased.

Thus, when the structure of the present embodiment is used as the structure of the electromagnetic clutch, the size reduction, the weight reduction, the improvement in the transmission torque, the reduction in the electric power consumption, and the cost reduction through the change in the material of the electromagnetic coil are possible for the electromagnetic clutch.

For example, according to the present embodiment, in comparison to the previously proposed electromagnetic clutch, the coil space can be increased while maintaining the size of the rotor. Therefore, the transmission torque can be improved. Furthermore, according to the present embodiment, in comparison to the previously proposed electromagnetic clutch, the size of the rotor can be reduced while maintaining the size of the coil space. Therefore, the size reduction and the weight reduction of the entire electromagnetic clutch are possible.

Furthermore, previously, a copper wire is used as the electromagnetic coil. In a case where the material of the electromagnetic coil is changed from the copper wire to an aluminum wire, which is less expensive in comparison to that copper wire, a larger coil space is required to generate the same excitation force. Thus, when the material of the electromagnetic coil is changed from the copper wire to the aluminum wire while maintaining the same coil space, the excitation force is disadvantageously reduced. In contrast, when the structure of the present embodiment is used, the coil space can be increased. Therefore, it is possible to change the material of the electromagnetic coil from the copper wire to the aluminum wire while limiting the reduction in the excitation force. Therefore, the cost reduction is possible.

Furthermore, in the present embodiment, the outer peripheral surface 311 of the outer cylindrical tubular portion 31 of the stator 30 is shaped into the stepped form that includes the first outer peripheral surface 311a and the second outer peripheral surface 311b, and the inner peripheral surface 321 of the inner cylindrical tubular portion 32 is shaped into the stepped form that includes the first inner peripheral surface 321a and the second inner peripheral surface 321b. The first outer peripheral surface 311a, the second outer peripheral surface 311b, the first inner peripheral surface 321a and the second inner peripheral surface 321b are in parallel with the axial direction.

In presswork, a subject processing surface, which is in parallel with the axial direction, can be more easily processed at a high dimension precision in comparison to a subject processing surface, which is tilted relative to the axial direction. Therefore, according to the present embodiment, the easiness of processing is high at the time of processing the stator 30 through the presswork, and thereby the cost reduction is possible. Furthermore, the first outer peripheral surface 311a, the second outer peripheral surface 311b, the first inner peripheral surface 321a and the second inner peripheral surface 321b can be processed at the high dimension precision. Therefore, the gap between each of these surfaces and the rotor 10 can be made constant.

Second Embodiment

A second embodiment is a modification, in which the shape of the inner peripheral surface 111 of the outer cylindrical tubular portion 11 and the shape of the outer peripheral surface 121 of the inner cylindrical tubular portion 12 in the rotor 10 as well as the shape of the outer peripheral surface 311 of the outer cylindrical tubular portion 31 and the shape of the inner peripheral surface 321 of the inner cylindrical tubular portion 32 in the stator 30 are changed from those of the first embodiment. The rest of the structure of the second embodiment is the same as that of the first embodiment.

Figure 8:
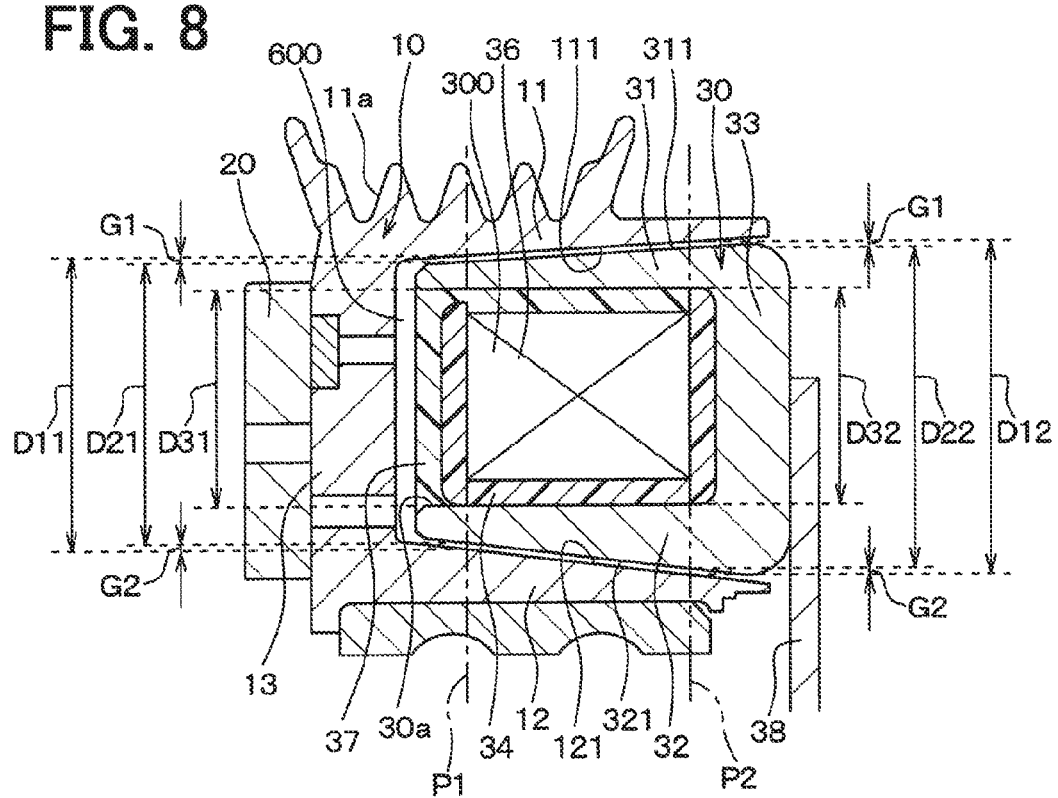
FIG. 8 is a cross-sectional view of a main feature of an electromagnetic clutch according to a second embodiment of the present disclosure.
Figure 9:
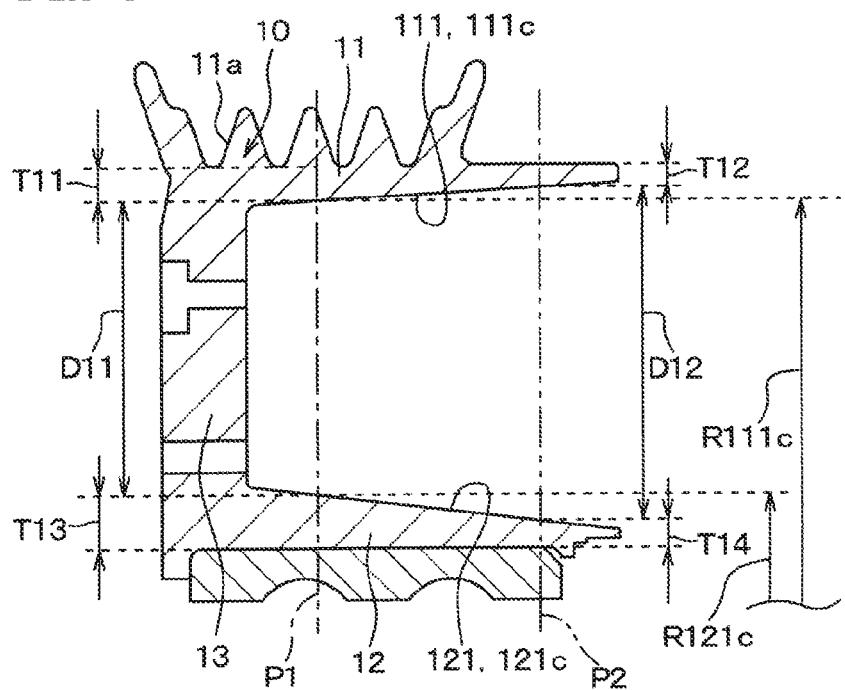
FIG. 9 is a cross-sectional view of a rotor shown in FIG. 8.

As shown in FIGS. 8 and 9, the inner peripheral surface 111c of the outer cylindrical tubular portion 11 of the rotor 10 is shaped into a tapered form, so that a diameter R111c of the inner peripheral surface 111c is progressively increased from the armature side toward the counter-armature side in the axial direction (the left side to the right side in the drawing). An outer peripheral surface 121c of the inner cylindrical tubular portion 12 of the rotor 10 is shaped into a tapered form, so that a diameter R121c of the outer peripheral surface 121c is progressively decreased from the armature side toward the counter-armature side.

Figure 10:
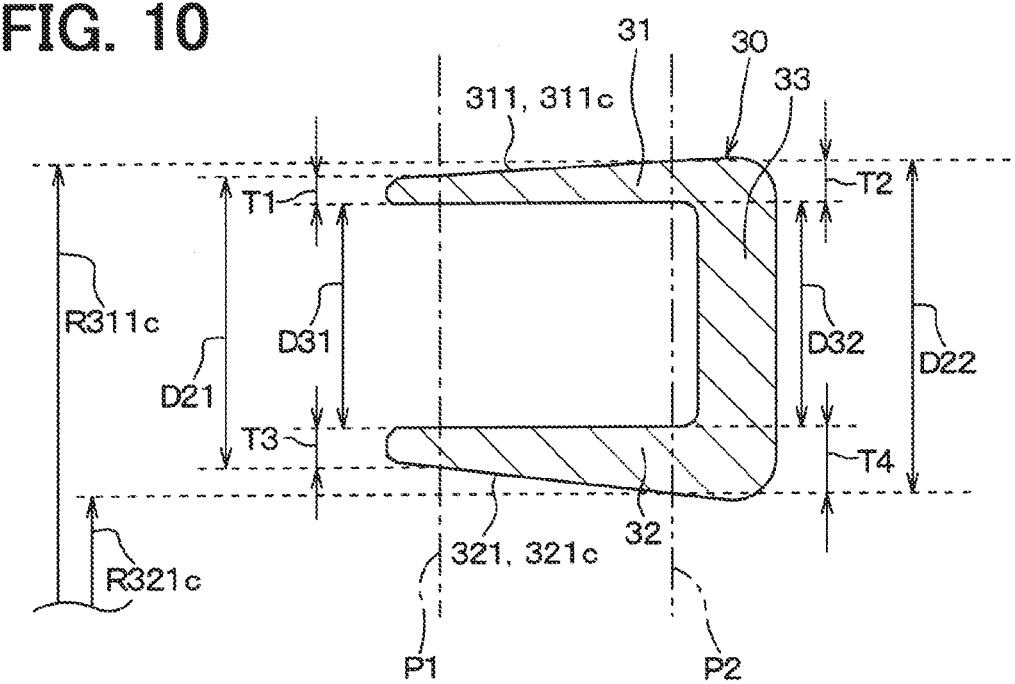
FIG. 10 is a cross-sectional view of a stator shown in FIG. 8.

As shown in FIGS. 8 and 10, an outer peripheral surface 311c of the outer cylindrical tubular portion 31 of the stator 30 is shaped into a tapered form, so that a diameter R311c of the outer peripheral surface 311c is progressively increased from the armature side toward the counter-armature side. An inner peripheral surface 321c of the inner cylindrical tubular portion 32 of the stator 30 is shaped into a tapered form, so that a diameter R321c of the inner peripheral surface 321c is progressively decreased from the armature side toward to the counter-armature side.

Even in the present embodiment, the following dimensional relationships are present like in the first embodiment.

Specifically, the outer cylindrical tubular portion 11 and the inner cylindrical tubular portion 12 of the rotor 10 satisfy the relationship of that the second distance D12 is larger than the first distance D11 (i.e., D11<D12). The outer cylindrical tubular portion 11 satisfies the relationship of that the second thickness T12 is smaller than the first thickness T11 (i.e., T11>T12). The inner cylindrical tubular portion 12 satisfies the relationship of that the second thickness T14 is smaller than the first thickness T13 (i.e., T13>T14).

The outer cylindrical tubular portion 31 and the inner cylindrical tubular portion 32 satisfy the relationship of that the second distance D22 is larger than the first distance D21 (i.e., D21<D22). The outer cylindrical tubular portion 31 satisfies the relationship of that the second thickness T2 is larger than the first thickness T1 (i.e., T1<T2). The inner cylindrical tubular portion 32 satisfies the relationship of that the second thickness T4 is larger than the first thickness T3 (i.e., T3<T4).

Figure 11:
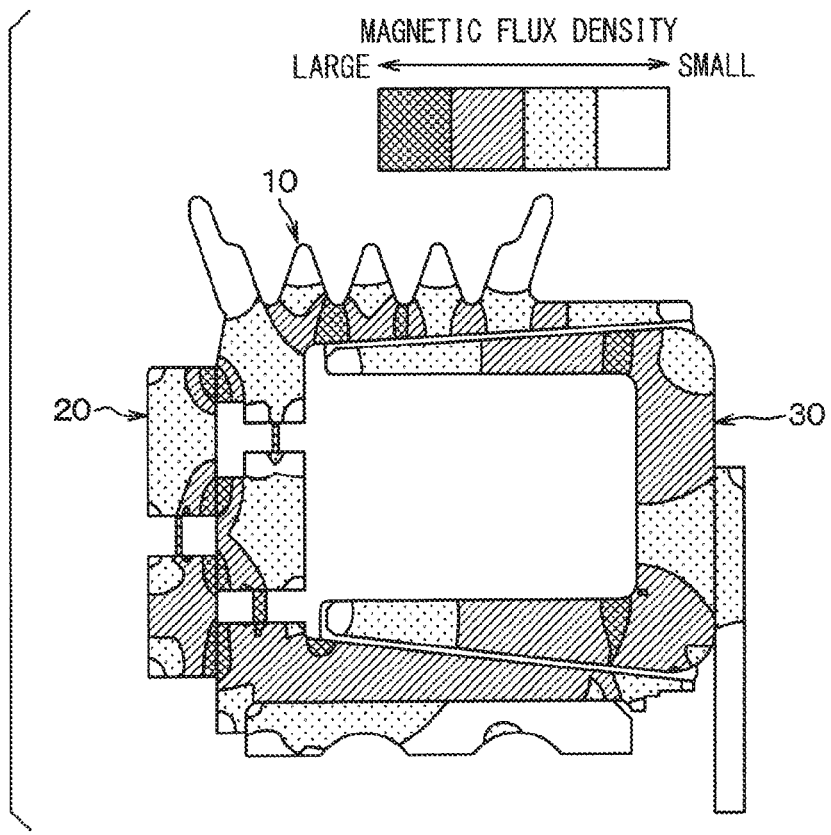
FIG. 11 is a diagram showing a result of magnetic field analysis of the rotor and the stator of the electromagnetic clutch of the second embodiment.

Furthermore, as shown in FIG. 11, a magnetic flux density distribution of the present embodiment is similar to the magnetic flux density distribution of FIG. 6. Thus, it is understood that in comparison to the first comparative example, the amount of magnetic flux, which flows through the entire magnetic circuit, is not reduced, and thereby the magnetic performance is not reduced in the present embodiment.

Therefore, even in the present embodiment, the advantages, which are similar to those of the first embodiment, can be achieved.

In the first embodiment, as shown in FIG. 7, the magnetic flux density becomes high at a location around a stepped part where the thickness is rapidly changed in each of the outer cylindrical tubular portion 11 and the inner cylindrical tubular portion 12 of the rotor 10. Similarly, the magnetic flux density becomes high at a location around a stepped part where the thickness is rapidly changed in each of the outer cylindrical tubular portion 31 and the inner cylindrical tubular portion 32 of the stator 30. Therefore, the high magnetic flux density region and the low magnetic flux density region are differently location in the stator 30 and the rotor 10.

In contrast, in the present embodiment, as shown in FIG. 11, a rate of change in the thickness in the axial direction (the left to right direction in the drawing) is moderate in the outer cylindrical tubular portion 11 and the inner cylindrical tubular portion 12 of the rotor 10. Thereby, a rate of change in the magnetic flux density in the axial direction is moderate in the outer cylindrical tubular portion 11 and the inner cylindrical tubular portion 12 of the rotor 10. Similarly, a rate of change in the thickness in the axial direction is moderate in the outer cylindrical tubular portion 31 and the inner cylindrical tubular portion 32 of the stator 30. Thereby, a rate of change in the magnetic flux density in the axial direction is moderate in the outer cylindrical tubular portion 31 and the inner cylindrical tubular portion 32 of the stator 30.

Thereby, according to the present embodiment, the magnetic flux density in the stator 30 and the magnetic flux density in the rotor 10 can be set to be closer to a constant magnetic flux density in comparison to the first embodiment.

Other Embodiments

The present disclosure should not be limited to the above embodiments, and the above embodiments may be appropriately modified within a scope of the present disclosure.

Figure 12:
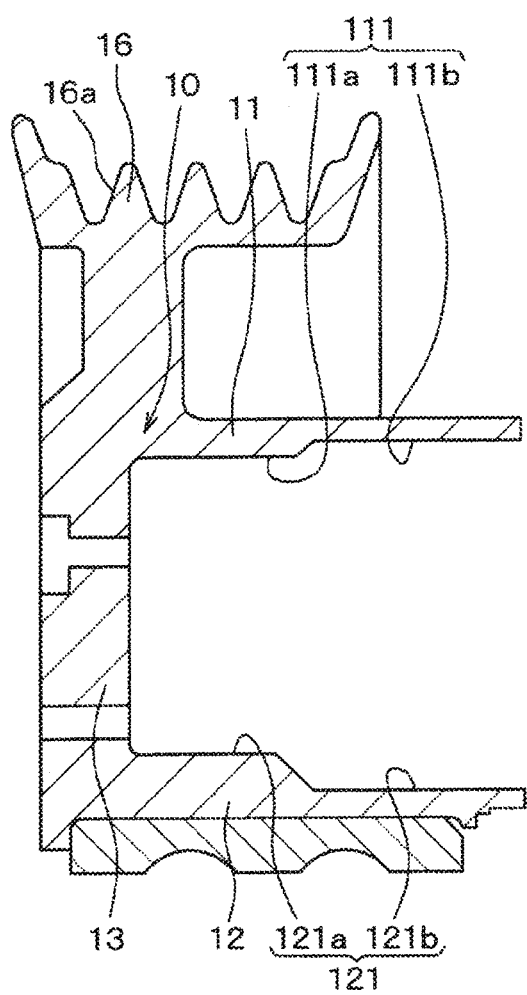
FIG. 12 is a cross-sectional view of a main feature of an electromagnetic clutch according to another embodiment.

(1) In each of the above embodiments, the V-groove 11a is formed at the outer peripheral surface of the outer cylindrical tubular portion 11 of the rotor 10. Alternatively, as shown in FIG. 12, a pulley portion 16, in which a V-groove 16a is formed, may be provided separately from the outer cylindrical tubular portion 11.

(2) In the first embodiment, the inner peripheral surface 111 of the outer cylindrical tubular portion 11 and the outer peripheral surface 121 of the inner cylindrical tubular portion 12 in the rotor 10 are respectively shaped into the corresponding stepped form that has the two stages, which are separated from each other by the step. Alternatively, the inner peripheral surface 111 of the outer cylindrical tubular portion 11 and the outer peripheral surface 121 of the inner cylindrical tubular portion 12 in the rotor 10 may be respectively shaped into a corresponding stepped form that has three or more stages, which are separated from each other by a corresponding step. This modification is equally applicable to the outer peripheral surface 311 of the outer cylindrical tubular portion 31 and the inner peripheral surface 321 of the inner cylindrical tubular portion 32 in the stator 30.

(3) In the first embodiment, the outer cylindrical tubular portion 11 and the inner cylindrical tubular portion 12 of the rotor 10 are both respectively shaped into the corresponding stepped form, and the outer cylindrical tubular portion 31 and the inner cylindrical tubular portion 12 of the stator 30 are both respectively shaped into the corresponding stepped form. Alternatively, among the outer cylindrical tubular portion 11 and the inner cylindrical tubular portion 12 of the rotor 10, only the outer cylindrical tubular portion 11 may be shaped into the corresponding stepped form. Also, at the same time, among the outer cylindrical tubular portion 31 and the inner cylindrical tubular portion 32 of the stator 30, only the outer cylindrical tubular portion 31 may be shaped into the stepped form. In this case, the inner cylindrical tubular portion 12 of the rotor 10 and the inner cylindrical tubular portion 32 of the stator 30 may be shaped into the shape of the inner cylindrical tubular portion 12 and the shape of the inner cylindrical tubular portion 32, respectively, of the first comparative example. Even in this case, the dimensional relationships discussed in the first embodiment are satisfied, and thereby the advantages, which are similar to those of the first embodiment, can be achieved.

Furthermore, among the outer cylindrical tubular portion 11 and the inner cylindrical tubular portion 12 of the rotor 10, only the inner cylindrical tubular portion 12 may be shaped into the stepped form. Also, at the same time, among the outer cylindrical tubular portion 31 and the inner cylindrical tubular portion 32 of the stator 30, only the inner cylindrical tubular portion 32 may be shaped into the stepped form.

Similarly, even in the second embodiment, among the outer cylindrical tubular portion 11 and the inner cylindrical tubular portion 12 of the rotor 10, only the outer cylindrical tubular portion 11 may be shaped into the tapered form. Also, at the same time, among the outer cylindrical tubular portion 31 and the inner cylindrical tubular portion 32 of the stator 30, only the outer cylindrical tubular portion 11 may be shaped into the tapered form. In contrast, among the outer cylindrical tubular portion 11 and the inner cylindrical tubular portion 12 of the rotor 10, only the inner cylindrical tubular portion 12 may be shaped into the tapered form. Also, at the same time, among the outer cylindrical tubular portion 31 and the inner cylindrical tubular portion 32 of the stator 30, only the inner cylindrical tubular portion 32 may be shaped into the tapered form. Even in these cases, the dimensional relationships discussed in the first embodiment are satisfied, and thereby the advantages, which are similar to those of the first embodiment, can be achieved.

(4) In each of the above embodiments, the rotor 10 satisfies the relationships of that with respect to the thickness of the outer cylindrical tubular portion 11, the second thickness T12 is smaller than the first thickness T11 (i.e., T11>T12), and with respect to the thickness of the inner cylindrical tubular portion 12, the second thickness T14 is smaller than the first thickness T13 (i.e., T13>T14). Alternatively, the thickness of the outer cylindrical tubular portion 11 and the thickness of the inner cylindrical tubular portion 12 may be set to be constant in the axial direction. In such a case, the thickness of the outer cylindrical tubular portion 11 may be set to be the second thickness T12, and the thickness of the inner cylindrical tubular portion 12 may be set to be the second thickness T14.

(5) The foregoing embodiments are not unrelated from each other but can be combined as appropriate except for the case where the combination is evidently impossible. For instance, the first embodiment and the second embodiment may be combined together. Specifically, one of the outer cylindrical tubular portion 11 and the inner cylindrical tubular portion 12 of the rotor 10 may be shaped into the stepped form, while the other one of the outer cylindrical tubular portion 11 and the inner cylindrical tubular portion 12 of the rotor 10 may be shaped into the tapered form. Similarly, one of the outer cylindrical tubular portion 31 and the inner cylindrical tubular portion 12 of the stator 30 may be shaped into the stepped form, and the other one of the outer cylindrical tubular portion 31 and the inner cylindrical tubular portion 12 may be shaped into the tapered form.

(6) In each of the above embodiments, it is clear that the components of the embodiment are not necessarily indispensable unless the components are explicitly stated as indispensable and thought to be theoretically indispensable.

The invention claimed is:

1. An electromagnetic clutch comprising:
    an electromagnetic coil that generates an electromagnetic attractive force at a time of energizing the electromagnetic coil;
    a rotor that is rotated about a rotational central axis when the rotor receives a rotational drive force from a drive source;
    an armature that is coupled to the rotor by the electromagnetic attractive force at the time of energizing the electromagnetic coil and is decoupled from the rotor at a time of deenergizing the electromagnetic coil; and
    a stator that is placed in an inside of the rotor and receives the electromagnetic coil in an inside of the stator, wherein:
    the rotor includes:
        an outer cylindrical tubular portion that is centered at the rotational central axis;
        an inner cylindrical tubular portion that is placed in an inside of the outer cylindrical tubular portion and is centered at the rotational central axis; and
        a wall portion that connects between an end part of the outer cylindrical tubular portion and an end part of the inner cylindrical tubular portion, which are located on an armature side where the armature is placed;
    the stator includes:
        an outer cylindrical tubular portion that is centered at the rotational central axis;

an inner cylindrical tubular portion that is placed in an inside of the outer cylindrical tubular portion of the stator and is centered at the rotational central axis; and a wall portion that connects between an end part of the outer cylindrical tubular portion of the stator and an end part of the inner cylindrical tubular portion of the stator, which are located on a counter-armature side that is apart from the armature;

the outer cylindrical tubular portion and the inner cylindrical tubular portion of the stator are placed in an inside space, which is surrounded by the outer cylindrical tubular portion, the inner cylindrical tubular portion and the wall portion of the rotor; and an outer peripheral surface of the outer cylindrical tubular portion of the stator is opposed to an inner peripheral surface of the outer cylindrical tubular portion of the rotor such that a gap is formed between the outer peripheral surface of the outer cylindrical tubular portion of the stator and the inner peripheral surface of the outer cylindrical tubular portion of the rotor; and an inner peripheral surface of the inner cylindrical tubular portion of the stator is opposed to an outer peripheral surface of the inner cylindrical tubular portion of the rotor such that a gap is formed between the inner peripheral surface of the inner cylindrical tubular portion of the stator and the outer peripheral surface of the inner cylindrical tubular portion of the rotor;

the electromagnetic coil is placed in an inside space that is surrounded by the outer cylindrical tubular portion, the inner cylindrical tubular portion and the wall portion of the stator;

the inner peripheral surface of the outer cylindrical tubular portion of the rotor is shaped into a stepped form that includes:
  a first inner peripheral surface;
  a second inner peripheral surface that is located on the counter-armature side of the first inner peripheral surface and has a diameter, which is larger than a diameter of the first inner peripheral surface; and
  a step that is tapered;

the outer peripheral surface of the inner cylindrical tubular portion of the rotor is shaped into a stepped form that includes:
  a first outer peripheral surface;
  a second outer peripheral surface that is located on the counter-armature side of the first outer peripheral surface and has a diameter, which is smaller than a diameter of the first outer peripheral surface; and
  a step that is tapered;

with respect to a distance between the outer cylindrical tubular portion and the inner cylindrical tubular portion of the rotor measured in a radial direction of the rotor, the outer cylindrical tubular portion and the inner cylindrical tubular portion of the rotor satisfy a relationship of that a second distance between the outer cylindrical tubular portion and the inner cylindrical tubular portion measured in the radial direction of the rotor at a location on the counter-armature side of a center location centered in an axial direction of the rotational central axis is larger than a first distance between the outer cylindrical tubular portion and the inner cylindrical tubular portion measured in the radial direction of the rotor at a location on the armature side of the center location centered in the axial direction of the rotational central axis;

the outer peripheral surface of the outer cylindrical tubular portion of the stator is shaped into a stepped form that includes:
  a first outer peripheral surface;
  a second outer peripheral surface that is located on the counter-armature side of the first outer peripheral surface and has a diameter, which is larger than a diameter of the first outer peripheral surface; and
  a step that is tapered;

the inner peripheral surface of the inner cylindrical tubular portion of the stator is shaped into a stepped form that includes:
  a first inner peripheral surface;
  a second inner peripheral surface that is located on the counter-armature side of the first inner peripheral surface and has a diameter, which is smaller than a diameter of the first inner peripheral surface; and
  a step that is tapered;

with respect to a distance between an outer peripheral surface of the outer cylindrical tubular portion of the stator and an inner peripheral surface of the inner cylindrical tubular portion of the stator measured in a radial direction of the stator, the outer cylindrical tubular portion and the inner cylindrical tubular portion of the stator satisfy a relationship of that a second distance between the outer peripheral surface of the outer cylindrical tubular portion of the stator and the inner peripheral surface of the inner cylindrical tubular portion of the stator measured in the radial direction of the stator at the location on the counter-armature side of the center location centered in the axial direction of the rotational central axis is larger than a first distance between the outer peripheral surface of the outer cylindrical tubular portion of the stator and the inner peripheral surface of the inner cylindrical tubular portion of the stator measured in the radial direction of the stator at the location on the armature side of the center location centered in the axial direction of the rotational central axis; and with respect to a thickness of the outer cylindrical tubular portion of the stator measured in the radial direction of the stator and a thickness of the inner cylindrical tubular portion of the stator measured in the radial direction of the stator, at least one of the outer cylindrical tubular portion and the inner cylindrical tubular portion of the stator satisfies a relationship of that a second thickness of the at least one of the outer cylindrical tubular portion and the inner cylindrical tubular portion of the stator measured in the radial direction of the stator at the location on the counter-armature side of the center location centered in the axial direction of the rotational central axis is larger than a first thickness of the at least one of the outer cylindrical tubular portion and the inner cylindrical tubular portion of the stator measured in the radial direction of the stator at the location on the armature side of the center location centered in the axial direction of the rotational central axis.

2. The electromagnetic clutch according to claim 1, wherein the step of the outer cylindrical tubular portion of the rotor, the step of the inner cylindrical tubular portion of the rotor, the step of the outer cylindrical tubular portion of the stator, and the step of the inner cylindrical tubular portion of the stator are respectively located between an armature side end location of the electromagnetic coil, which is located on the armature side in the axial direction of the rotational central axis, and a counter-armature side end location of the electromagnetic coil, which is located on the counter-armature side in the axial direction of the rotational central axis.

3. The electromagnetic clutch according to claim 1, wherein:
the outer cylindrical tubular portion of the stator satisfies the relationship of that the second thickness of the outer cylindrical tubular portion of the stator is larger than the first thickness of the outer cylindrical tubular portion of the stator; and
with respect to a thickness of the outer cylindrical tubular portion of the rotor measured in the radial direction of the rotor, the outer cylindrical tubular portion of the rotor satisfies a relationship of that a second thickness of the outer cylindrical tubular portion of the rotor measured in the radial direction of the rotor at the location on the counter-armature side of the center location centered in the axial direction of the rotational central axis is smaller than a first thickness of the outer cylindrical tubular portion of the rotor measured in the radial direction of the rotor at the location on the armature side of the center location centered in the axial direction of the rotational central axis.

4. The electromagnetic clutch according to claim 1, wherein:
the inner cylindrical tubular portion of the stator satisfies the relationship of that the second thickness of the inner cylindrical tubular portion of the stator is larger than the first thickness of the inner cylindrical tubular portion of the stator; and
with respect to a thickness of the inner cylindrical tubular portion of the rotor measured in the radial direction of the rotor, the inner cylindrical tubular portion of the rotor satisfies a relationship of that a second thickness of the inner cylindrical tubular portion of the rotor measured in the radial direction of the rotor at the location on the counter-armature side of the center location centered in the axial direction of the rotational central axis is smaller than a first thickness of the inner cylindrical tubular portion of the rotor measured in the radial direction of the rotor at the location on the armature side of the center location centered in the axial direction of the rotational axis.

* * * * *